(12) United States Patent
Ohguchi

(10) Patent No.: US 11,069,987 B2
(45) Date of Patent: Jul. 20, 2021

(54) RADAR DEVICE

(71) Applicant: DENSO TEN Limited, Kobe (JP)

(72) Inventor: Katsuyuki Ohguchi, Kobe (JP)

(73) Assignee: DENSO TEN Limited, Kobe (JP)

( * ) Notice: Subject to any disclaimer, the term of this patent is extended or adjusted under 35 U.S.C. 154(b) by 367 days.

(21) Appl. No.: 16/354,745

(22) Filed: Mar. 15, 2019

(65) Prior Publication Data

US 2019/0379137 A1  Dec. 12, 2019

(30) Foreign Application Priority Data

Jun. 7, 2018  (JP) .............................. JP2018-109498

(51) Int. Cl.
| | | |
|---|---|---|
| *H01Q 21/22* | (2006.01) | |
| *G01S 13/34* | (2006.01) | |
| *G01S 7/35* | (2006.01) | |
| *G01S 13/931* | (2020.01) | |

(52) U.S. Cl.
CPC .............. *H01Q 21/22* (2013.01); *G01S 7/352* (2013.01); *G01S 13/343* (2013.01); *G01S 13/931* (2013.01); *G01S 7/356* (2021.05)

(58) Field of Classification Search
CPC .......... G01S 7/032; G01S 7/352; G01S 13/32; G01S 13/42; G01S 13/931; H01Q 1/32; H01Q 1/3233; H01Q 21/00; H01Q 21/22; H01Q 21/28

See application file for complete search history.

(56) References Cited

U.S. PATENT DOCUMENTS

| | | | | |
|---|---|---|---|---|
| 8,742,980 | B2* | 6/2014 | Shirakawa .............. | G01S 13/42 |
| | | | | 342/165 |
| 8,816,898 | B2* | 8/2014 | Shirakawa .............. | G01S 13/42 |
| | | | | 342/147 |
| 10,942,268 | B2* | 3/2021 | Iida ........................ | H01Q 21/28 |
| 2006/0066474 | A1* | 3/2006 | Shirakawa ................ | G01S 7/35 |
| | | | | 342/147 |
| 2008/0303711 | A1* | 12/2008 | Matsuoka ................. | G01S 3/32 |
| | | | | 342/196 |
| 2009/0079617 | A1* | 3/2009 | Shirakawa .............. | G01S 13/87 |
| | | | | 342/146 |

(Continued)

FOREIGN PATENT DOCUMENTS

| | | |
|---|---|---|
| JP | 2010-216845 A | 9/2010 |
| JP | 2017-191033 A | 10/2017 |
| JP | 2018-136219 A | 8/2018 |

*Primary Examiner* — Peter M Bythrow
(74) *Attorney, Agent, or Firm* — Oliff PLC

(57) ABSTRACT

A radar device includes: reception array antennas each including virtual antennas constructed from plural transmission antennas and plural reception antennas; and a transmission control unit which controls transmission waves transmitted from the transmission antennas, the plural transmission antennas include: a first transmission antenna group having at least two of the transmission antennas that are spaced from each other by a prescribed first interval; and a second transmission antenna group having at least one of the transmission antenna that is spaced, by a prescribed second interval, from a synthesized antenna that is the first transmission antenna group as regarded as a single antenna; and the transmission control unit is capable of switching between: a first mode and a second mode as defined herein.

20 Claims, 9 Drawing Sheets

(56) References Cited

U.S. PATENT DOCUMENTS

| | | | | |
|---|---|---|---|---|
| 2018/0149735 A1* | 5/2018 | Lim | ..................... | G01S 13/931 |
| 2018/0151961 A1* | 5/2018 | Lim | ......................... | G01S 7/03 |
| 2018/0252809 A1* | 9/2018 | Davis | .................... | G01S 13/931 |
| 2019/0235066 A1* | 8/2019 | Iida | ........................ | H01Q 21/08 |
| 2019/0377059 A1* | 12/2019 | Kondo | .................. | H01Q 21/29 |

* cited by examiner (WIDE ANGLE SIDE ← FRONT SIDE → WIDE ANGLE SIDE)
DIRECTION (WIDE ANGLE SIDE ← FRONT SIDE → WIDE ANGLE SIDE)
DIRECTION

RADAR DEVICE

CROSS-REFERENCE TO RELATED APPLICATIONS

This application is based on and claims priority under 35 USC 119 from Japanese Patent Application No. 2018-109498 filed on Jun. 7, 2018.

FIELD OF THE INVENTION

The present disclosure relates to a radar device.

BACKGROUND OF THE INVENTION

MIMO (multiple input multiple output) radars are known. In MIMO radars, data received by a virtual array antenna of L×M elements are generated by transmitting radio waves by an array antenna having M elements and receiving radio waves reflected by a target by an array antenna having L elements (refer to JP-A-2017-191033).

SUMMARY OF THE INVENTION

Incidentally, detection area-related requirements for radar devices vary depending on the purpose of use. For example, where a radar device is used in a system (e.g., RCTA system (rear cross traffic alert system)) for arousing attention of a driver etc. by detecting another vehicle that is approaching the self vehicle from the left or right side of a course along which the self vehicle is going to exit a garage, the radar device is desired to be capable of detection in a short-distance, wide-angle area. Where a radar device is used in a system (e.g., LCA (lane change assist) system) for allowing the self vehicle to move to an adjoining lane automatically, the radar device is desired to be capable of detection in a long-distance, narrow-angle area.

It is necessary to change the shape of a beam that is transmitted from a transmission antenna according to a required detection distance and detection angular range. However, in MIMO radars, to construct a reception virtual array antenna, it is necessary to equalize the characteristics of plural transmission antennas. Thus, conventionally, to obtain a transmission beam shape that is suitable for a required detection distance and detection angular range, it is necessary to produce, individually, a MIMO radar that meets the requirements.

An object of the present invention is to provide a technique capable of performing switching between detection areas and constructing a virtual array antenna in a radar device.

To attain the object, a radar device of the present invention comprises: reception array antennas each including virtual antennas constructed from plural transmission antennas and plural reception antennas; and a transmission control unit which controls transmission waves transmitted from transmission antennas, wherein: the plural transmission antennas include: a first transmission antenna group having at least two transmission antennas that are spaced from each other by a prescribed first interval; and a second transmission antenna group having at least one transmission antenna that is spaced, by a prescribed second interval, from a synthesized antenna that is the first transmission antenna group as regarded as a single antenna; and the transmission control unit can switch between: a first mode in which to control the transmission antennas of the first transmission antenna group independently of each other; and a second mode in which to control the synthesized antenna and the second transmission antenna group independently of each other (First Configuration).

In the radar device of the First Configuration, it is preferable that the transmission antennas of the first transmission antenna group have approximately the same antenna characteristics; and the synthesized antenna and the second transmission antenna group as regarded as a single antenna have approximately the same antenna characteristics (Second Configuration).

In the radar device of the First or Second Configuration, it is preferable that, when regarded as a single antenna, the second transmission antenna group has an aperture area that is obtained by multiplying an aperture area of each of the transmission antennas of the first transmission antenna group by the number of transmission antennas of the first transmission antenna group (Third Configuration).

In the radar device of any one of the First to Third Configuration, it is preferable that the transmission control unit has plural kinds of prescribed transmission patterns in which to transmit transmission waves; in the first mode, controls the transmission antennas of the first transmission antenna group by assigning one of the transmission patterns to each of the transmission antennas of the first transmission antenna group; and in the second mode, controls the synthesized antenna and the second transmission antenna group by assigning one of the transmission patterns to each of the synthesized antenna and the second transmission antenna group (Fourth Configuration).

In the radar device of the Fourth Configuration, is may be that the plural kinds of prescribed transmission patterns include patterns that are deviated from each other in transmission-on timing and transmission-off timing (Fifth Configuration).

In the radar device of the Fourth Configuration, it may be that the plural kinds of prescribed transmission patterns include patterns that are different from each other in a transmission phase modulation pattern (Sixth Configuration).

In the radar device of any one of the First to Sixth Configurations, it may be that the second transmission antenna group is a synthesized antenna in which plural transmission antennas that can be controlled independently of each other by the transmission control unit are regarded as a single antenna (Seventh Configuration).

In the radar device of any one of the First to Seventh Configurations, it is preferable that the plural virtual antennas are arranged at the same intervals in a prescribed direction in each of the first mode and the second mode (Eighth Configuration).

The invention makes it possible to perform switching between detection areas and construct a virtual array antenna in a radar device.

DETAILED DESCRIPTION OF THE INVENTION

Illustrative embodiments of the present invention will be hereinafter described in detail with reference to the drawings.

1. Embodiment 1

Outline of Radar Device 1

Figure 1:
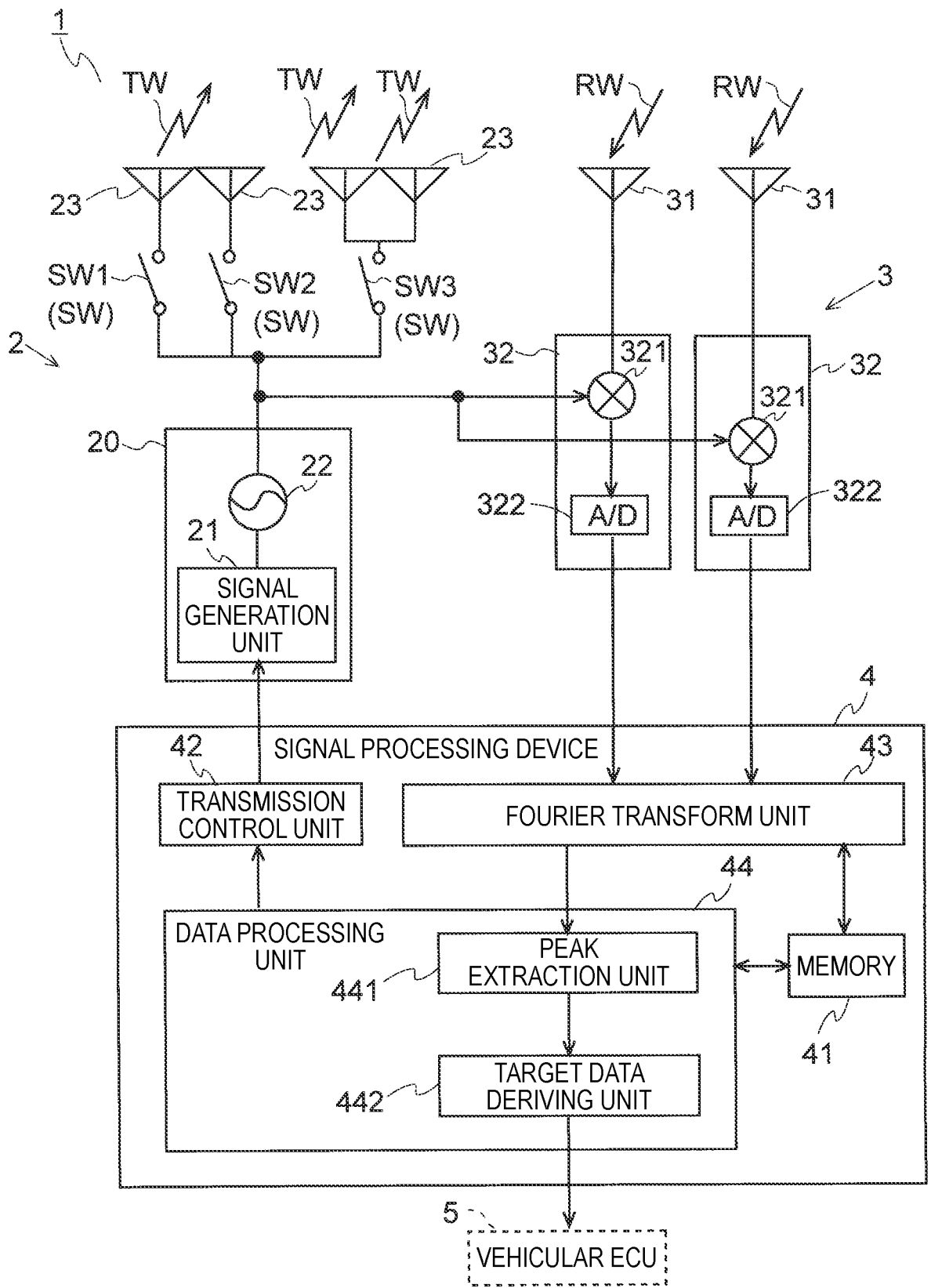
FIG. 1 is a block diagram showing an example configuration of a radar device according to a first embodiment of the present invention.

FIG. 1 is a block diagram showing the configuration of a radar device 1 according to a first embodiment of the invention. The radar device 1 can be installed in mobile bodies such as a vehicle, an airplane, and a ship. In this embodiment, the radar device 1 is installed in a vehicle such as an automobile. In the following description, a vehicle in which the radar device 1 is installed will be referred to as a self vehicle.

The radar device 1 is used for detecting targets existing around the self vehicle such as another vehicle, a traffic sign, a guard rail, and a human. Detection results of targets are output to a storage device of the self vehicle, a vehicular ECU (electrical control unit) 5 for controlling a behavior of the self vehicle, or the like and used for vehicle control of an RCTA system, an LCA system, a PCS (pre-crash safety system), an AEBS (advanced emergency braking system), etc.

As shown in FIG. 1, the radar device 1 is equipped with a transmission unit 2, reception units 3, and a signal processing device 4. The radar device 1 is what is called a MIMO radar device.

The transmission unit 2 is equipped with a signal generation unit 21, an oscillator 22, transmission antennas 23, and switching units SW.

The signal generation unit 21 and the oscillator 22 constitute a transmission processing unit 20. The oscillator 22 generates a transmission signal by modulating a signal generated by the signal generation unit 21. The transmission signal is output to the transmission antennas 23. The transmission signal is also supplied to mixers 321 (described later). For example, the transmission signal is a radio-frequency signal in a millimeter band that is modulated so that its frequency repeats linear gradual increase and decrease alternately over time or repeats linear gradual increase or decrease over time. A radio-frequency signal of the former type is an FMCW (frequency modulation continuous wave) signal and a radio-frequency signal of the latter type is an FCM (first chirp modulation) signal.

The transmission antennas 23 convert a transmission signal that is output from the oscillator 22 into transmission waves TW and transmits them. In the embodiment, the radar device 1 is equipped with plural (three in the example shown in FIG. 1) transmission antennas 23. For example, the plural transmission antennas 23 are planar antennas such as microstrip antennas. For example, each transmission antenna 23 is configured so as to have at least one unit transmission antenna in which plural radiation elements arranged in a prescribed direction (in the embodiment, vertical direction) are connected to each other by a straight transmission line. Transmission waves TW transmitted outward (e.g., toward the front side or the rear side of the self vehicle) from the transmission antennas 23 are reflected by a target such as another vehicle and become reflection waves RW.

The switching units SW are provided between the oscillator 22 and the transmission antennas 23. One switching unit SW is provided for each transmission antenna 23. In the embodiment, the switching units SW are provided in the same number (three) as the transmission antennas 23. Each switching unit SW switches between an on-state for inputting a transmission signal to the associated transmission antenna 23 and an off state for not doing so. The switching units SW which operate in this manner can perform both of input of a transmission signal to all the transmission antennas 23 and input of a transmission signal to only part of the transmission antennas 23.

Each reception unit 3 is equipped with a reception antenna 31 and a reception processing unit 32. The radar device 1 according to the embodiment is equipped with plural (two in the example shown in FIG. 1) reception units 3. Each reception antenna 31 receives reflection waves RW from a target and outputs a resulting reception signal to the associated reception processing unit 32. For example, the plural reception antennas 31 are planar antennas such as microstrip antennas. For example, each reception antenna 31 is configured so as to have at least one unit reception antenna in which plural reception elements arranged in a prescribed direction (in the embodiment, vertical direction) are connected to each other by a straight transmission line.

Each reception processing unit 32 is equipped with a mixer 321 and an A/D converter 322. One reception processing unit 32 is provided for each reception antenna 31. A reception signal obtained by each reception antenna 31 is amplified by a low-noise amplifier (not shown) and then sent to the mixer 321. Also receiving a transmission signal generated by the oscillator 22, the mixer 321 mixes the transmission signal and the reception signal together and thereby generates a beat signal having a beat frequency that is the difference between a frequency of the transmission signal and a frequency of the reception signal. Beat signals relating to the respective reception antennas 31 generated by the mixers 321 are converted into digital signals by the A/D converters 322, respectively, in such a manner as to be timed with each other by a synchronization unit (not shown) and then output to the signal processing device 4.

When plural targets exist that are different from each other in relative speed and distance, reflection waves that are different from each other in phase shift or Doppler shift are received by each reception antenna 31 and a beat signal generated by the associated mixer 321 contains various components corresponding to the respective targets.

The signal processing device 4 performs various kinds of processing on the basis of beat signals taken in via the A/D converters 322. The various kinds of processing include processing for generating data received by a virtual array antenna (described later). The signal processing device 4 is implemented as a microcomputer that includes a CPU (central processing unit), a memory 41, etc. The signal processing device 4 stores various data to be subjected computation in the memory 41 which is a storage device. The memory 41 is a RAM (random access memory), for example.

The signal processing device 4 is equipped with, as functions implemented by software in the microcomputer, a transmission control unit 42, a Fourier transform unit 43, and a data processing unit 44. In other words, the radar device 1 is equipped with the transmission control unit 42.

The transmission control unit 42 controls transmission waves TW to be transmitted from the transmission antennas 23. In the embodiment, the transmission control unit 42 controls the transmission unit 2 which includes the plural transmission antennas 23 for transmitting transmission waves TW. More specifically, the transmission control unit 42 controls the signal generation unit 21 and controls the turning on/off of the switching units SW.

The Fourier transform unit 43 performs fast Fourier transform (FFT) processing. The FFT processing calculates reception levels and pieces of phase information at respective frequency points (may be called "frequency bins") that are set at a prescribed frequency interval. Information obtained through the calculation in the Fourier transform unit 43 is input to the data processing unit 44.

The data processing unit 44 is equipped with a peak extraction unit 441 and a target data deriving unit 442. The peak extraction unit 441 detects a peak from a result of FFT processing etc. of the Fourier transform unit 43. The target data deriving unit 442 derives target data of a target that exists, for example, ahead of or in the rear of the self vehicle on the basis of the extracted peak. The target data includes a distance to the target, a relative speed of the target, and a direction of the target. The target data deriving unit 442 outputs the derived target data to the vehicular ECU 5 etc.

1-2. Antenna Configurations

Figure 2:
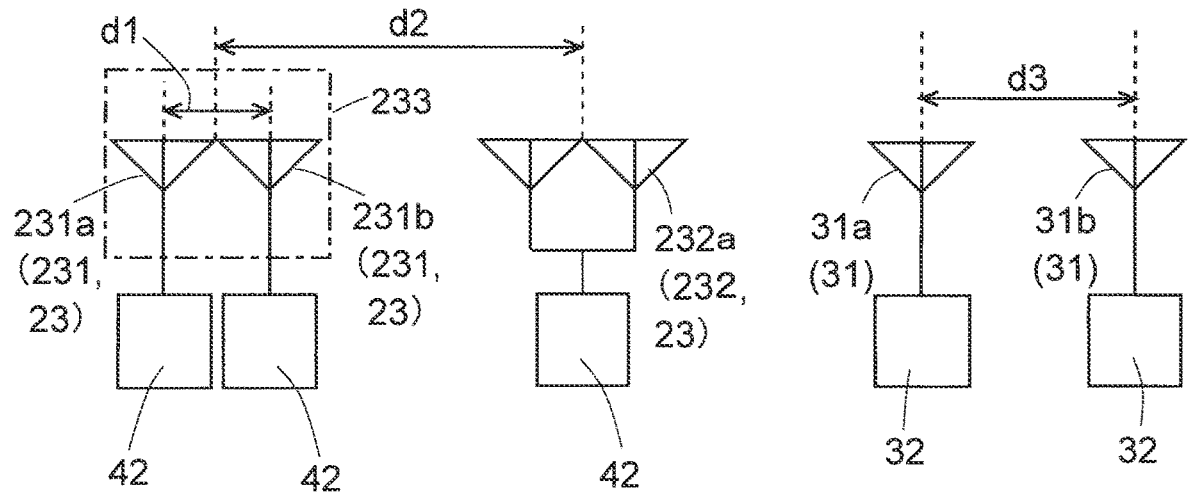
FIG. 2 is a schematic diagram showing an antenna configuration of the radar device.

FIG. 2 is a schematic diagram showing the configurations of the antennas 23 and 31 which are installed in the radar device 1 according to the first embodiment of the invention.

As shown in FIG. 2, the plural transmission antennas 23 include a first transmission antenna group 231 and a second transmission antenna group 232. The first transmission antenna group 231 is equipped with at least two transmission antennas 23. In the embodiment, the first transmission antenna group 231 includes two transmission antennas 231a and 231b. The second transmission antenna group 232 is equipped with at least one transmission antenna 23. In the embodiment, the second transmission antenna group 232 is equipped with one transmission antenna 232a. The transmission antennas 231a and 231b of the first transmission antenna group 231 and the transmission antenna 232a of the second transmission antenna group 232 are arranged in the same plane. The two transmission antennas 231a and 231b of the first transmission antenna group 231 can transmit transmission waves TW independently of each other. The second transmission antenna group 232 can transmit transmission waves TW independently of the transmission antennas 231a and 231b of the first transmission antenna group 231.

The at least two transmission antennas 23 of the first transmission antenna group 231 are spaced from each other by a prescribed first interval d1. In the embodiment, the two transmission antennas 231a and 231b are arranged in a plane that is parallel with the vertical direction, so as to be spaced from each other in a horizontal direction by the first interval d1.

The transmission antennas 231a and 231b of the first transmission antenna group 231 have the same antenna characteristics. That is, the transmission antennas 231a and 231b of the first transmission antenna group 231 are configured so as to be the same in terms of various antenna-related characteristics and distributions such as the equi-phase surface, the gain profile and phase profile in a transmission direction, and the gain absolute value. The transmission antennas 231a and 231b need not always be the same in all the antenna characteristics, and items in which the transmission antennas 231a and 231b are the same may be determined as appropriate in designing. For example, even if the transmission antennas 231a and 231b are different from each other in the gain absolute value, they can be used as if to be antennas having the same characteristics by performing corrections by disposing an amplifier and an attenuator (not shown) upstream of the antennas 231a and 231b. In this manner, a reception virtual array antenna can be constructed properly by combining the plural transmission antennas 231a and 231b of the first transmission antenna group 231 and the plural reception antennas 31.

In the embodiment, all the transmission antennas 231a and 231b of the first transmission antenna group 231 have the same antenna characteristics. More specifically, the two transmission antennas 231a and 231b have the same structure and the same antenna characteristics. The term "same" does not means that they are the same in a strict sense but means that they can be regarded as having the same structure and the same antenna characteristics in a sense that prescribed errors determined by restrictions relating designing etc. are included. The term "same" will be used in this sense in the following description unless otherwise specified.

The second transmission antenna group 232 is disposed so as to be spaced by a prescribed second interval d2 from a synthesized antenna 233 that is the first transmission antenna group 231 as regarded as a single antenna. The term "synthesized antenna" means an antenna that is considered equivalent to one virtual antenna that is formed by plural antennas and assumed to have the same antenna characteristics such as a gain profile as the plural antennas. That is, the first transmission antenna group 231 and the second transmission antenna group 232 can be regarded equivalently as synthesized antennas A and B, respectively.

In the embodiment, where the synthesized antenna 233 is constructed, the transmission antennas 231a and 231b of the first transmission antenna group 231 transmit transmission waves TW in the same phase with the same timing. In the embodiment, the second transmission antenna group 232 is disposed so as to be spaced by the second interval d2 from the synthesized antenna 233 that is the transmission antennas 231a and 231b of the first transmission antenna group 231 as regarded as a single antenna.

The second transmission antenna group 232 is disposed in the same plane as the first transmission antenna group 231. More specifically, the second transmission antenna group 232 is spaced by the second interval d2 in the horizontal direction from the synthesized antenna 233 that is the two transmission antennas 231a and 231b of the first transmission antenna group 231 as regarded as a single antenna. In the embodiment, the second interval d2 is four times the first interval d1.

In the embodiment, where the synthesized antenna 233 is constructed, the plural transmission antennas 231a and 231b are energized in the same phase with the same timing. However, this is just an example. For example, to construct the synthesized antenna 233, the plural transmission antennas 231a and 231b may be energized in different phases.

The synthesized antenna 233 can be regarded as having the same antenna characteristics as the second transmission antenna group 232 as regarded as a single antenna. That is, the synthesized antenna 233 can substantially be regarded as the same as the second transmission antenna group 232. Thus, a reception virtual array antenna can be constructed properly by combining the synthesized antenna 233, the second transmission antenna group 232, and the plural reception antennas 31.

In the embodiment, when regarded as a single antenna, the second transmission antenna group 232 has an aperture area having a value obtained by multiplying the aperture area of each of the transmission antennas 231a and 231b of the first transmission antenna group 231 by the number of first transmission antenna group 231. This makes it easy to equalize the antenna characteristics of the second transmission antenna group 232 with that of the synthesized antenna 233. In the embodiment, the second transmission antenna group 232 has an aperture area that is two times the aperture area of each of the transmission antennas 231a and 231b of the first transmission antenna group 231. For example, where each of the transmission antennas 231a and 231b is constructed by one unit transmission antenna mentioned above, the one transmission antenna 232a that constitutes the second transmission antenna group 232 may be formed by two unit transmission antennas that are spaced from each other by the first interval d1 in the horizontal direction and connected to each other by a power supply line.

In the embodiment, as mentioned above, the number of reception antennas 31 is equal to two. The two reception antennas 31a and 31b have the same structure and the same antenna characteristics and are arranged in a plane that is parallel with the vertical direction, so as to be spaced from each other by a prescribed third interval d3 in the horizontal direction. In the embodiment, the transmission antennas 23 and the reception antennas 31 are arranged in the same plane. The third interval d3 is two times the first interval d1. For example, each reception antenna 31 may have either the same characteristics as or different characteristics than each of the transmission antennas 231a and 231b of the first transmission antenna group 231 or the transmission antenna 232a of the second transmission antenna group 232.

1-3. Transmission Control

The transmission control unit 42 is configured so as to be able to switch between a first mode and a second mode. A transmission control performed by the radar device 1 will be described below for a case that the radar device 1 is of the FCM type.

In the first mode, a control is performed on the first transmission antenna group 231. That is, the first mode is a mode in which the transmission antennas 231a and 231b of the first transmission antenna group 231 are controlled independently of each other. In other words, the first mode is a mode in which a transmission antenna having a narrow aperture area is formed and, as a result, a wide transmission beam is formed and in which a virtual array antenna is constructed using the transmission antennas 231a and 231b of the first transmission antenna group 231.

In the embodiment, in the first mode, transmission of transmission waves TW from the second transmission antenna group 232 is suspended. In the first mode, the one transmission antenna 231a and the other transmission antenna 231b of the two transmission antennas 231a and 231b of the first transmission antenna group 231 are controlled as independent antennas.

Figure 3:
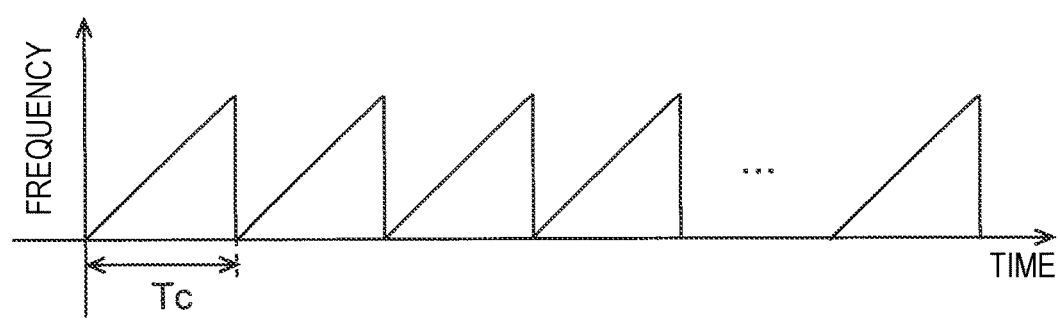
FIG. 3 is a chart for description of a transmission control that is performed in a first mode.

FIG. 3 is a chart for description of a transmission control that is performed in the first mode of the radar device 1 according to the first embodiment. As shown in the upper part of FIG. 3, the transmission unit 2 generates, under the control of the transmission control unit 42, a transmission signal in which a chirp signal whose frequency increases over time is repeated at a prescribed cycle (hereinafter referred to as a "chirp cycle Tc"). Transmission waves TW are transmitted according to the transmission signal.

The lower part of FIG. 3 shows a switching control on the switching units SW. A first switching unit SW1 is a switching unit SW that is connected to the one transmission antenna 231a. A second switching unit SW2 is a switching unit SW that is connected to the other transmission antenna 231b. A third second switching unit SW3 is a switching unit SW that is connected to the transmission antenna 232a which constitutes the second transmission antenna group 232. As shown in the lower part of FIG. 3, in the first mode, the third second switching unit SW3 is always kept off and hence no transmission waves are transmitted from the second transmission antenna group 232.

As shown in the lower part of FIG. 3, in the first mode, each of the first switching unit SW1 and the second switching unit SW2 repeats an operation that it is turned on and off at the chirp cycle Tc. However, the timing with which the first switching unit SW1 is turned on (or off) and the timing with which the second switching unit SW2 is turned on (or off) is deviated from each other by one chirp cycle Tc. In other words, in the first mode, the transmission control unit 42 deviates, between the transmission antennas 231a and 231b of the first transmission antenna group 231, the timing with which the transmission antenna 231a or 231b transmits transmission waves TW. More specifically, while the first switching unit SW1 which is connected to the one transmission antenna 231a is on, the transmission control unit 42 keeps off the second switching unit SW2 which is connected to the other transmission antenna 231b. While the second switching unit SW2 which is connected to the other transmission antenna 231a is on, the transmission control unit 42 keeps off the first switching unit SW1 which is connected to the one transmission antenna 231a.

In the second mode, controls are performed on the first transmission antenna group 231 and the second transmission antenna group 232. More specifically, the second mode is a mode in which the synthesized antenna 233 and the second transmission antenna group 232 are controlled independently of each other. In other words, the second mode is a mode in which a transmission antenna having a wide aperture area is formed and, as a result, a narrow transmission beam is formed and in which a virtual array antenna is constructed using the respective synthesized antennas of the first transmission antenna group 231 and the second transmission antenna group 232.

Figure 4:
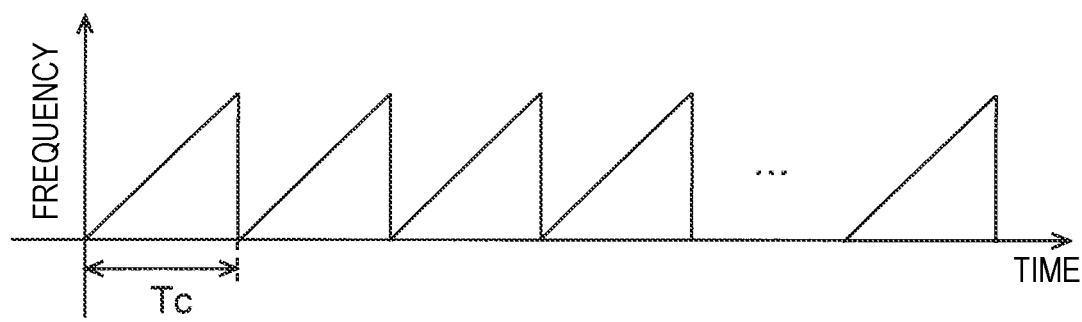
FIG. 4 is a chart for description of a transmission control that is performed in a second mode.

FIG. 4 is a chart for description of a transmission control that is performed in the second mode of the radar device 1 according to the first embodiment. As shown in the upper part of FIG. 4, the transmission unit 2 generates, under the control of the transmission control unit 42, a transmission signal in which a chirp signal whose frequency increases over time is repeated at the prescribed chirp cycle Tc. Transmission waves TW are transmitted according to the transmission signal.

The lower part of FIG. 4 shows a switching control on the switching units SW. As shown in the lower part of FIG. 4, in the second mode, each of the first switching unit SW1, the second switching unit SW2, and the third switching unit SW3 repeats an operation that it is turned on and off at the chirp cycle Tc. Whereas the first switching unit SW1 and the second switching unit SW2 are turned on and off with the same timing, the timing with which the third switching unit SW3 is turned on (or off) is deviated from the timing with which the first switching unit SW1 and the second switching unit SW2 are turned on (or off) by one chirp cycle Tc. In other words, in the second mode, the transmission control unit 42 deviates, between the synthesized antenna 233 and the second transmission antenna group 232, the timing with which the synthesized antenna 233 or the second transmission antenna group 232 transmits transmission waves TW. More specifically, while the first switching unit SW1 and the second switching unit SW2 which are connected to the synthesized antenna 233 are on, the transmission control unit 42 keeps off the third switching unit SW3 which is connected to the second transmission antenna group 232. While the third switching unit SW3 which is connected to the second transmission antenna group 232 is on, the transmission control unit 42 keeps off the first switching unit SW1 and the second switching unit SW2 which are connected to the synthesized antenna 233.

As described above, the transmission control unit 42 has plural kinds of prescribed transmission patterns for transmission of transmission waves TW. In the embodiment, the plural kinds of prescribed transmission patterns include a pattern in which the transmission-on timing and the transmission-off timing are deviated from each other. That is, respective switching patterns for the first switching unit SW1, the second switching unit SW2, and the third switching unit SW3 constitute each transmission pattern.

In the first mode, the transmission control unit 42 performs a control by assigning one of the plural kinds of prescribed transmission patterns to each of the transmission antennas 231a and 231b of the first transmission antenna group 231. In the above-described example, a switching pattern (see FIG. 3) for the first switching unit SW1 is assigned to the transmission antenna 231a as a transmission pattern. A switching pattern (see FIG. 3) for the second switching unit SW2 is assigned to the transmission antenna 231b as a transmission pattern.

In the second mode, the transmission control unit 42 performs a control by assigning one of the plural kinds of prescribed transmission patterns to each of the synthesized antenna 233 and the second transmission antenna group 232. The same switching pattern (see FIG. 4) for the first switching unit SW1 and the second switching unit SW2 is assigned to the synthesized antenna 233 as a transmission pattern. A switching pattern (see FIG. 4) for the third switching unit SW3 is assigned to the second transmission antenna group 232 as a transmission pattern.

As described above, the transmission control unit 42 causes transmission of transmission waves TW in a time-divisional manner in each of the first mode and the second mode. In the first mode, a set of transmission waves TW that do not interfere with each other can be transmitted from the transmission antennas 231a and 231b of the first transmission antenna group 231 in a time-divisional manner. As a result, a reception signal received by each reception antenna 31 can be separated into components that originate from the respective transmission antennas 231a and 231b and a virtual array antenna can be constructed by combining the two transmission antennas 231a and 231b and the two reception antennas 31.

In the second mode, a set of transmission waves TW that do not interfere with each other can be transmitted from the synthesized antenna 233 and the second transmission antenna group 232 in a time-divisional manner. As a result, a reception signal received by each reception antenna 31 can be separated into components that originate from the synthesized antenna 233 and the second transmission antenna group 232, respectively, and a virtual array antenna can be constructed by combining the synthesized antenna 233, the second transmission antenna group 232, and the two reception antennas 31.

Figure 5:
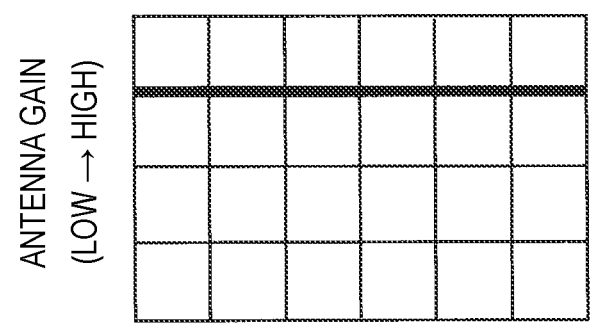
FIG. 5 is a chart for description of a transmission beam shape in the first mode.
Figure 6:
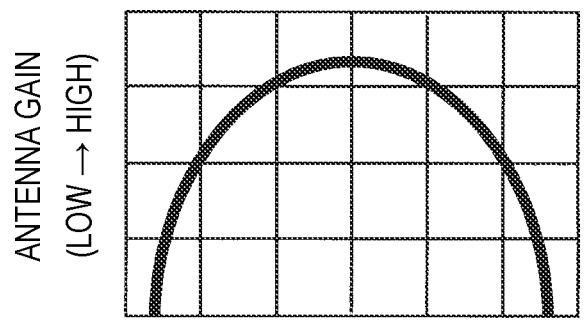
FIG. 6 is a chart for description of a transmission beam shape in the second mode.

FIG. 5 is a chart for description of a transmission beam shape in the first mode. FIG. 6 is a chart for description of a transmission beam shape in the second mode. In FIGS. 5 and 6, the horizontal axis represents the direction and the vertical axis represents the antenna gain. The shape of a transmission beam transmitted from each transmission antenna 23 varies depending on its aperture area. The width of a transmission beam tends to increase as the aperture area becomes wider and decrease as the aperture area becomes narrower.

In the first mode, the aperture area of a transmission antenna corresponds to the aperture area of the transmission antenna 231a or 231b of the first transmission antenna group 231. On the other hand, in the second mode, the aperture area of a transmission antenna corresponds to two times the aperture area of each of the transmission antennas 231a and 231b of the first transmission antenna group 231. That is, the aperture area of the transmission antenna in the second mode is larger than that in the first mode. Thus, in the first mode, as shown in FIG. 5, a transmission beam pattern is obtained in which the antenna gain is kept at a constant level in a wide angular range in the horizontal direction. Such a beam pattern is useful for a short-distance, wide-angle use. On the other hand, in the second mode, a transmission beam pattern is obtained in which the antenna gain is high in a narrow angular range in the horizontal direction. Such a beam pattern is useful for a long-distance, narrow-angle use.

As seen from the above description, according to the embodiment, the shape of a transmission beam can be changed by switching between the first mode and the second mode. The detection area of the radar device 1 can be switched by switching between the first mode and the second mode. More specifically, a radar device suitable for a short-distance, wide-angle use can be realized by selecting the first mode and a radar device suitable for a long-distance, narrow-angle use can be realized by selecting the second mode.

1-4. Virtual Array Antennas

The radar device 1 has reception array antennas each including virtual antennas constructed by plural transmission antennas 23 and plural reception antennas 31. That is, the embodiment can attain both of switching between transmission beam characteristics such as a beam pattern and formation of virtual array antennas having antenna arrangements that are suitable for processing. This makes it possible to attain, for example, both of detection area switching and formation of a reception array antenna using a virtual array antenna.

Figure 7:
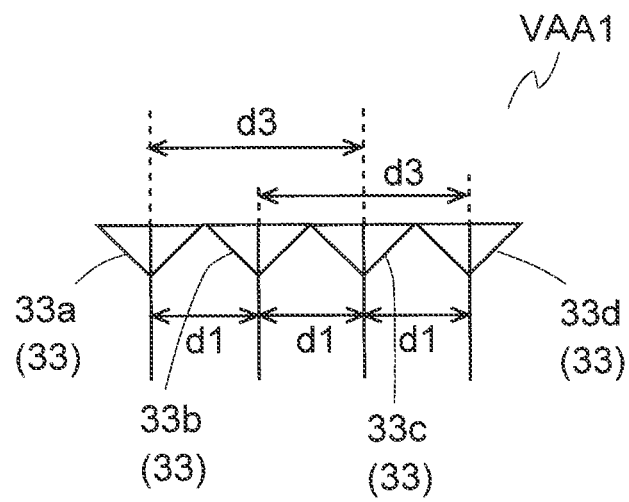
FIG. 7 is a diagram showing the configuration of a first virtual array antenna.

In the first mode, a virtual array antenna is constructed using the transmission antennas 231a and 231b of the first transmission antenna group 231. A first virtual array antenna VAA1 is constructed by combining the two transmission antennas 231a and 231b and the two reception antennas 31a and 31b. FIG. 7 shows the configuration of the first virtual array antenna VAA1. As shown in FIG. 7, the first virtual array antenna VAA1 is constructed by four virtual antennas 33a-33d.

A first virtual antenna 33a is a combination of one transmission antenna 231a and one reception antenna 31a that is one of the two reception antennas 31a and 31b. A second virtual antenna 33b is a combination of the other transmission antenna 231b and the one reception antenna 31a. A third virtual antenna 33c is a combination of the one transmission antenna 231a and the other reception antenna 31b that is the other of the two reception antennas 31a and 31b. A fourth virtual antenna 33c is a combination of the other transmission antenna 231b and the other reception antenna 31b.

The four virtual antennas 33a-33d are arranged at the same intervals in the horizontal direction. In the embodiment, the distance between adjacent virtual antennas is equal to the first interval d1. The distances between adjacent pairs of virtual antennas are determined by how the distance between the plural transmission antennas 231a and 231b of the first transmission antenna group 231 and the distance between the plural reception antennas 31 are set. It is preferable that the distances between adjacent pairs of virtual antennas be identical. The virtual antennas may be arranged at intervals that are an integer multiple of a minimum interval, that is, in a pattern in which they are arranged in a grid having equal intervals so as to produce empty grid points. Alternatively, the virtual antennas may be arranged at entirely different intervals.

Figure 8:
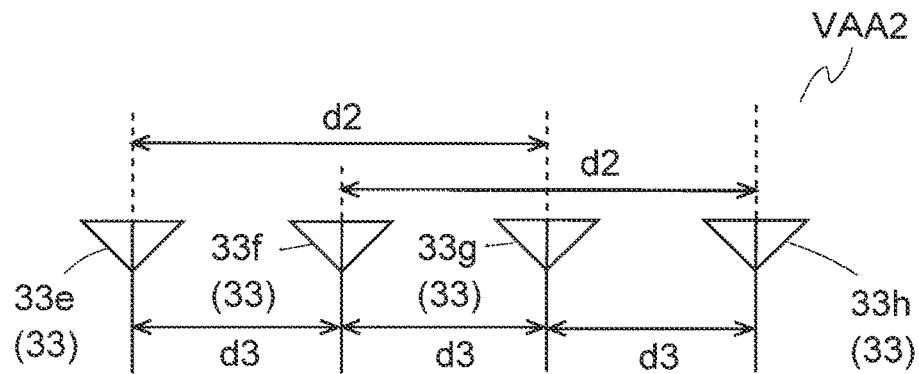
FIG. 8 is a diagram showing the configuration of a second virtual array antenna.

In the second mode, a virtual array antenna is constructed using the synthesized antenna 233 and the second transmission antenna group 232. A second virtual array antenna VAA2 is constructed by combining the synthesized antenna 233, the second transmission antenna group 232, and the two reception antennas 31a and 31b. FIG. 8 shows the configuration of the second virtual array antenna VAA2. As shown in FIG. 8, the second virtual array antenna VAA2 is constructed by four virtual antennas 33e-33h.

A fifth virtual antenna 33e is a combination of the synthesized antenna 233 and one reception antenna 31a. A sixth virtual antenna 33f is a combination of the synthesized antenna 233 and the other reception antenna 31b. A seventh virtual antenna 33g is a combination of the second transmission antenna group 232 and the one reception antenna 31a. An eighth virtual antenna 33h is a combination of the second transmission antenna group 232 and the other reception antenna 31b.

The four virtual antennas 33e-33h are arranged at the same intervals in the horizontal direction. In the embodiment, the distance between adjacent virtual antennas is equal to the third interval d3. The distances between adjacent pairs of virtual antennas are determined by how the distance between the synthesized antenna 233 and the second transmission antenna group 232 and the distance between the plural reception antennas 31 are set. It is preferable that the distances between adjacent pairs of virtual antennas be identical. The virtual antennas may be arranged at intervals that are an integer multiple of a minimum interval, that is, in a pattern in which they are arranged in a grid having equal intervals so as to produce empty grid points. Alternatively, the virtual antennas may be arranged at entirely different intervals.

As described above, it is preferable that the plural virtual antennas 33 constituting each of the virtual array antennas VAA1 (first mode) and VAA2 (second mode) be arranged at the same intervals in a prescribed direction. In the embodiment, the prescribed direction is the horizontal direction. This configuration makes it possible to prevent signal processing for obtaining target information using the first virtual array antenna VAA1 or VAA2 from becoming complex.

The antenna arrangements of the virtual array antennas VAA1 and VAA2 can be designed by setting the distance (d1) between the transmission antennas 231a and 231b of the first transmission antenna group 231, the distance (d2) between the synthesized antenna 233 and the second transmission antenna group 232, and the distance (d3) between the reception antennas 31 as appropriate. It is convenient in terms of processing if the antenna arrangements of the virtual array antennas VAA1 (first mode) and VAA2 (second mode) are similar to each other. It is preferable to set the ratio d1:d2:d3 equal to 1:4:2 as in the embodiment because the antenna arrangements of the virtual array antennas VAA1 (first mode) and VAA2 (second mode) become similar to each other and the virtual antennas 33 are arranged at the same intervals.

1-5. Signal Processing 1-5-1. First Mode

Figure 9:
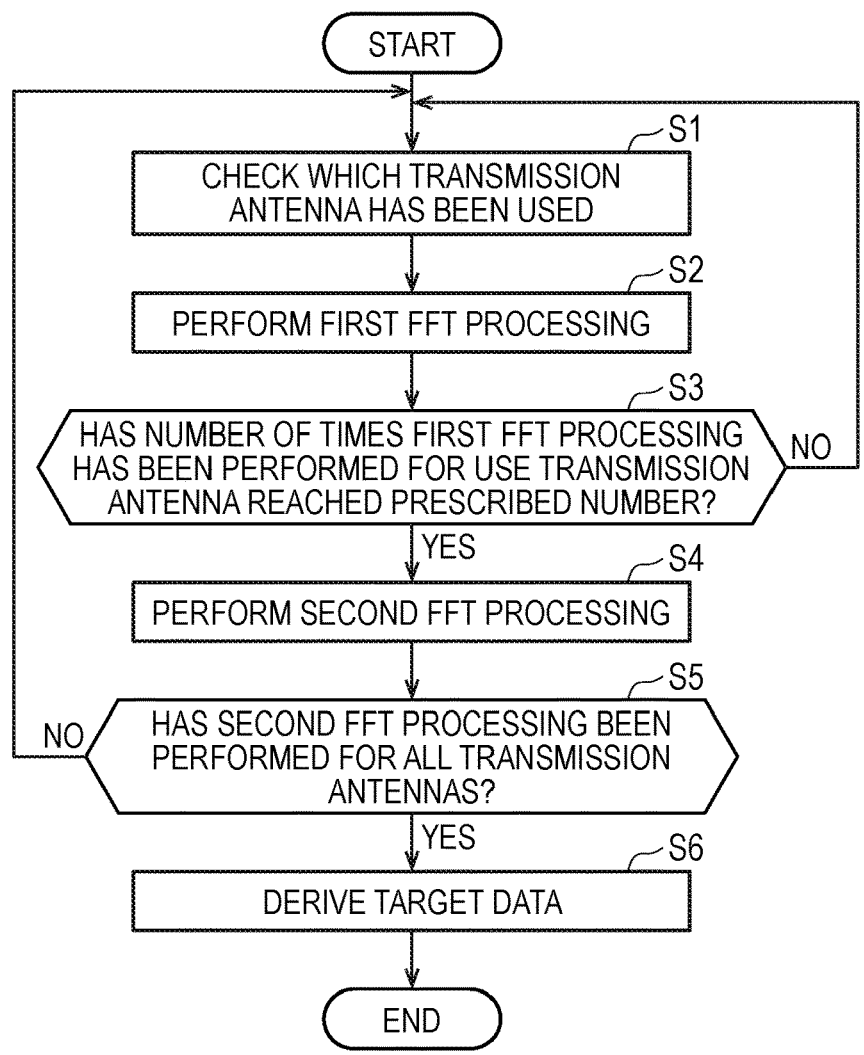
FIG. 9 is a flowchart of a signal processing process for deriving target data.

FIG. 9 is a flowchart of a signal processing process for deriving target data in the radar device 1 according to the first embodiment. The following description will be made of an example in which the radar device 1 is of the FCM type. The signal processing process shown in FIG. 9 is executed for signals obtained from the respective reception antennas 31a and 31b of the radar device 1.

In the first mode, switching is made at the chirp cycle Tc between the state that the one transmission antenna 231a is used and the state that the other transmission antenna 231b is used. At step S1, the signal processing device 4 checks which of the transmission antennas 231a and 231b has been used to obtain a beat signal supplied from a reception processing unit 32. This check can be made using information acquired from the transmission control unit 42.

In this example, the one transmission antenna 231a is used in a first chirp cycle Tc and the other transmission antenna 231b is used in a second chirp cycle Tc. Switching between the two transmission antennas 231a and 231b is made thereafter in this order.

After a transmission antenna used has been found, at step S2, first FFT processing is performed on a beat signal obtained as corresponding to transmission waves TW transmitted from the thus-found use transmission antenna for the prescribed period (chirp cycle Tc). The first FFT processing is performed by the Fourier transform unit 43.

A result of the first FFT processing is a frequency spectrum of the beat signal. Reception levels and pieces of phase information are extracted by the FFT processing for respective frequency bins that are set at a frequency interval that is suitable for a frequency resolution. Since the frequency bins of the first FFT processing correspond to target distances, they may be referred to as "distance bins" below. A distance of a target can be detected by determining a distance bin where a peak exists.

The first FFT processing is performed on signals obtained from the respective reception antennas 31a and 31b. Thus, when the use transmission antenna is the one transmission antenna 231a, a first FFT processing result corresponding to the first virtual antenna 33a and a first FFT processing result corresponding to the third virtual antenna 33c are obtained. When the use transmission antenna is the other transmission antenna 231b, a first FFT processing result corresponding to the second virtual antenna 33b and a first FFT processing result corresponding to the fourth virtual antenna 33d are obtained.

At step S3, it is judged if the number of times the first FFT processing has been performed for the use transmission antenna that was found at step S1 has reached a prescribed number. If the number of times the first FFT processing has been performed on the use transmission antenna has not reached the prescribed number yet (S3: no), the process returns to step S1.

If the number of times the first FFT processing has been performed for the use transmission antenna has reached the prescribed number yet (S3: yes), at step S4 frequency spectra obtained by performing the first FFT processing for the use transmission antenna that was found at step S1 are arranged in time series and second FFT processing is performed thereon. The second FFT processing produces frequency spectra in each of which a peak exists in a frequency bin corresponding to a Doppler frequency (hereinafter may be referred to as a "speed bin"). These frequency spectra are determined for the respective distance bins of the first FFT processing. A relative speed of a target can be detected by determining a speed bin where a peak exists. The second FFT processing is also performed by the Fourier transform unit 43.

The second FFT processing is also performed on signals obtained from the respective reception antennas 31a and 31b. Thus, when the use transmission antenna is the one transmission antenna 231a, a second FFT processing result corresponding to the first virtual antenna 33a and a second FFT processing result corresponding to the third virtual antenna 33c are obtained. When the use transmission antenna is the other transmission antenna 231b, a second FFT processing result corresponding to the second virtual antenna 33b and a second FFT processing result corresponding to the fourth virtual antenna 33d are obtained.

Then, at step S5, the signal processing device 4 judges whether the second FFT processing has been performed for all of the transmission antennas 231a and 231b. If the second FFT processing has not been performed for all of the transmission antennas 231a and 231b yet (S5: no), the process returns to step S1. If the second FFT processing has been performed for all of the transmission antennas 231a and 231b (S5: yes), which means that second FFT processing results have been obtained for all of the transmission antennas 231a and 231b, target data are derived at step S6.

More specifically, the peak extraction unit 441 extracts peaks whose power values are larger than a prescribed value on the basis of a two-dimensional power spectrum that has been obtained by the second FFT processing and has a distance bin axis and a speed bin axis. The target data deriving unit 442 estimates directions in which targets exist on the basis of peak detection results obtained for each of the virtual antennas 33a-33d. Directions are estimated by a known technique such as MUSIC (multiple signal classification) or ESPRIT (estimation of signal parameters via rotation invariance techniques). The target data deriving unit 442 derives a distance and a relative speed of each target on the basis of a combination of a distance bin and a speed bin that have been determined as peak bins.

In the first mode, as described above, the detection area is a short-distance, wide-angle area. Thus, the first mode can be used when, for example, it is desired to realize an RCTA system using the radar device 1.

1-5-2. Second Mode

In the second mode, the radar device 1 derives target data by performing signal processing similar to the signal processing performed in the first mode. A signal processing process that is executed in the second mode will therefore be described briefly with reference to FIG. 9.

In the second mode, switching is made at the chirp cycle Tc between the state that the synthesized antenna 233 is used and the state that the second transmission antenna group 232 is used. At step S1, the signal processing device 4 checks which of the synthesized antenna 233 and the second transmission antenna group 232 has been used to obtain a beat signal supplied from a reception processing unit 32.

After a transmission antenna used has been found, at step S2, first FFT processing is performed on a beat signal obtained as corresponding to transmission waves TW that are transmitted from the thus-found use transmission antenna for the prescribed period (chirp cycle Tc).

The first FFT processing is performed on signals obtained from the respective reception antennas 31a and 31b. Thus, when the use transmission antenna is the synthesized antenna 233, a first FFT processing result corresponding to the fifth virtual antenna 33e and a first FFT processing result corresponding to the sixth virtual antenna 33f are obtained. When the use transmission antenna is the second transmission antenna group 232, a first FFT processing result corresponding to the seventh virtual antenna 33g and a first FFT processing result corresponding to the eighth virtual antenna 33h are obtained.

At step S3, it is judged if the number of times the first FFT processing has been performed for the use transmission antenna that was found at step S1 has reached a prescribed number. If the number of times the first FFT processing has been performed for the use transmission antenna has not reached the prescribed number yet (S3: no), the process returns to step S1.

If the number of times the first FFT processing has been performed for the use transmission antenna has reached the prescribed number yet (S3: yes), at step S4 frequency spectra obtained by the first FFT processing are arranged in time series and second FFT processing is performed thereon.

The second FFT processing is also performed on signals obtained from the respective reception antennas 31a and 31b. Thus, when the use transmission antenna is the synthesized antenna 233, a second FFT processing result corresponding to the fifth virtual antenna 33e and a second FFT processing result corresponding to the sixth virtual antenna 33f are obtained. When the use transmission antenna is the second transmission antenna group 232, a second FFT processing result corresponding to the seventh virtual antenna 33g and a second FFT processing result corresponding to the eighth virtual antenna 33h are obtained.

Then, at step S5, the signal processing device 4 judges whether the second FFT processing has been performed for both of the synthesized antenna 233 and the second transmission antenna group 232. If the second FFT processing has not been performed for both of the synthesized antenna 233 and the second transmission antenna group 232 yet (S5: no), the process returns to step S1. If the second FFT processing has been performed for both of the synthesized antenna 233 and the second transmission antenna group 232 (S5: yes), which means that second FFT processing results have been obtained for all of the virtual antennas 33e-33d, target data are derived at step S6.

In the second mode, as described above, the detection area is a long-distance, narrow-angle area. Thus, the second mode can be used when, for example, it is desired to realize an LCA system using the radar device 1.

2. Embodiment 2

A radar device according to a second embodiment has approximately the same configuration as the radar device 1 according to the first embodiment. Thus, that part of the second embodiment which is common to the first embodiment will not be described; that part of the second embodiment which is different from the first embodiment will mainly be described below. Items having the same ones in the first embodiment will be given the same reference symbols as the latter. For example, the radar device according to the second embodiment is an FCM-type radar device.

2-1. Configuration of Transmission Unit 2A

Figure 10:
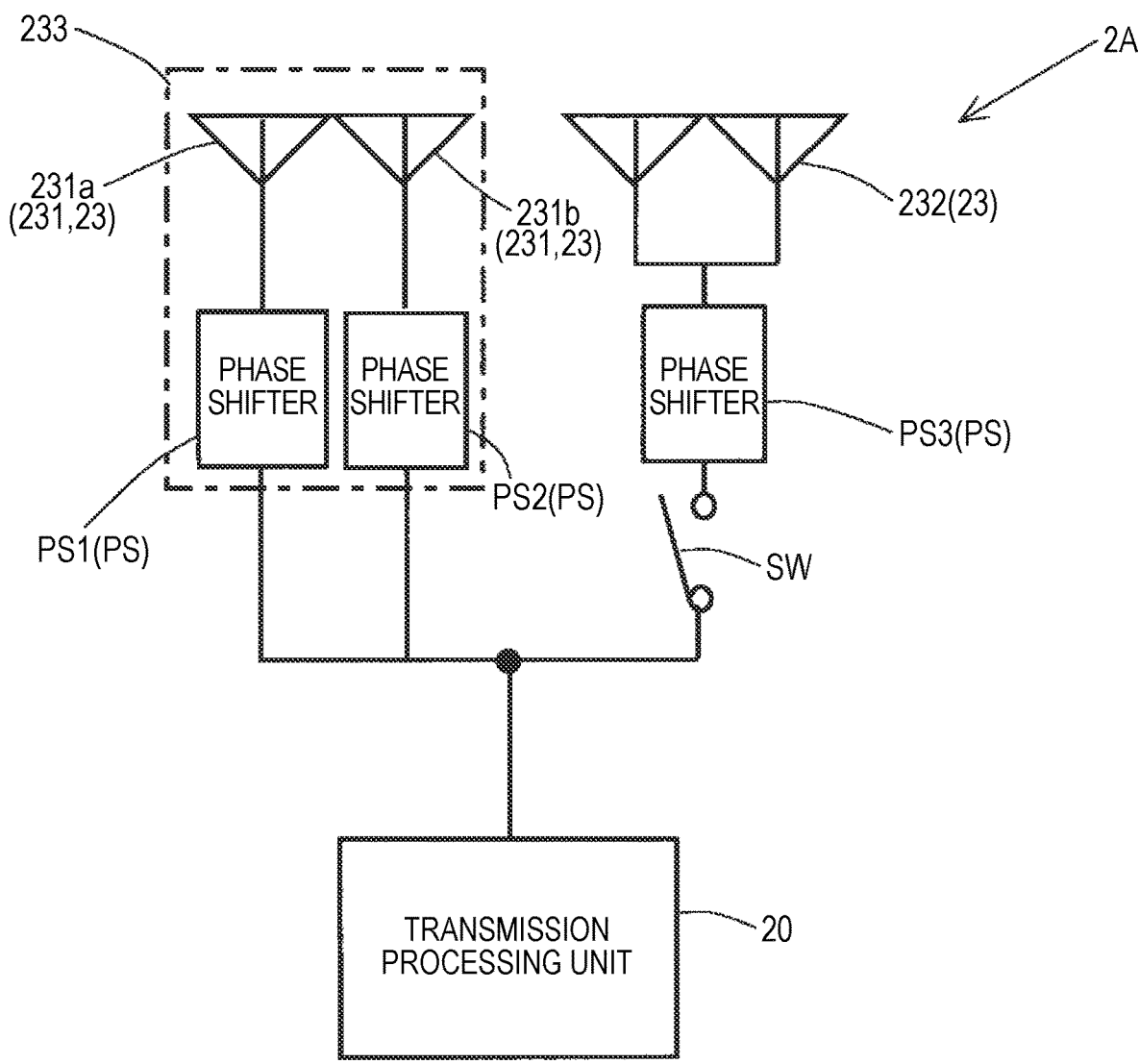
FIG. 10 is a diagram showing the configuration of a transmission unit employed in a radar device according to a second embodiment.

FIG. 10 is a diagram showing the configuration of a transmission unit 2A employed in the radar device according to the second embodiment. As shown in FIG. 10, the transmission unit 2A is equipped with a transmission processing unit 20 having a signal generation unit 21 and an oscillator 22, two transmission antennas 231a and 231b constituting a first transmission antenna group 231, and one transmission antenna 232a constituting a second transmission antenna group 232. The two transmission antennas 231a and 231b constituting the first transmission antenna group 231 can become a synthesized antenna 233. The above features are the same as in the first embodiment. The radar device according to the second embodiment is different from the radar device 1 according to the first embodiment in that the former is equipped with phase shifters PS.

The phase shifters PS adjust the phase of a transmission signal that has been generated by the transmission processing unit 20. The phase shifters PS are disposed between the transmission processing unit 20 and the respective transmission antennas 23. One phase shifter PS is provided for each transmission antenna 23. In this embodiment, the number of phase shifters PS is three that is the same as the number of transmission antennas 23. A switching unit SW is provided between the transmission processing unit 20 and the phase shifter PS that is connected to the transmission antenna 232a which constitutes the second transmission antenna group 232. The switching unit SW can switch between an on-state in which a transmission signal is input to the second transmission antenna group 232 and an off-state in which no transmission signal is input to the second transmission antenna group 232.

2-2. Transmission Control

In the first embodiment, to realize the virtual array antennas VAA1 and VAA2, a time-divisional operation is performed in transmitting transmission waves TW. However, this is just an example and a time-divisional operation need not always be employed. In the second embodiment, an operation that is different from a time-divisional operation is performed to realize the virtual array antennas VAA1 and VAA2. More specifically, PSK (phase shift keying) is used in place of the time-division method.

Figure 11:
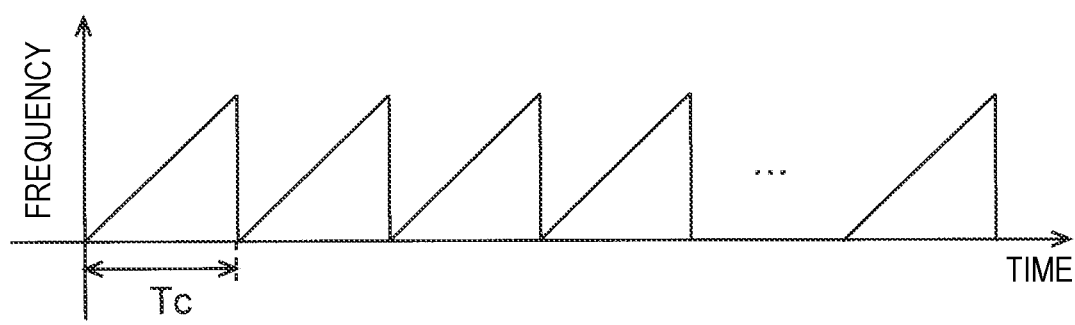
FIG. 11 is a chart for description of a transmission control that is performed in a first mode.

FIG. 11 is a chart for description of a transmission control that is performed in a first mode in the radar device according to the second embodiment. As shown in the upper part of FIG. 11, the transmission unit 2A generates, under the control of the transmission control unit 42, a transmission signal in which a chirp signal whose frequency increases over time is repeated at a prescribed cycle Tc. Transmission waves TW are transmitted according to the transmission signal.

The lower part of FIG. 11 shows a control operation performed on the phase shifters PS. A first phase shifter PS1 is a phase shifter PS that is connected to one transmission antenna 231a. A second phase shifter PS2 is a phase shifter PS that is connected to the other transmission antenna 231b. A third phase shifter PS3 is a phase shifter PS that is connected to the transmission antenna 232a of the second transmission antenna group 232. As shown in the lower part of FIG. 11, in the first mode, the switching unit SW is kept off and hence the third phase shifter PS3 does not operate. In other words, in the first mode, no transmission waves are transmitted from the second transmission antenna group 232.

As shown in the lower part of FIG. 11, in the first mode, the first phase shifter PS1 supplies a transmission signal having a constant phase to the one transmission antenna 231a at the chirp cycle Tc. The second phase shifter PS2 supplies a transmission signal whose phase is inverted (i.e., changed by 180°) every chirp cycle Tc to the other transmission antenna 231b. The phases 0° and 180° shown in FIG. 11 are just examples; for example, phases 90° and 270° may be employed in place of the respective phases 0° and 180°.

In other words, in the first mode, the transmission control unit 42 causes the plural transmission antennas 231a and 231b to transmit transmission waves TW in different phase modulation patterns. This makes it possible to discriminate between a reception signal that originates from transmission waves TW transmitted from the one transmission antenna 231a and a reception signal that originates from transmission waves TW transmitted from the other transmission antenna 231b. That is, a virtual array antenna can be constructed by combining the two transmission antennas 231a and 231b and the two reception antennas 31a and 31b. More specifically, as in the first embodiment, a first virtual array antenna VAA1 consisting of four virtual antennas 33a-33d can be constructed by the two transmission antennas 231a and 231b and the two reception antennas 31a and 31b.

Figure 12:
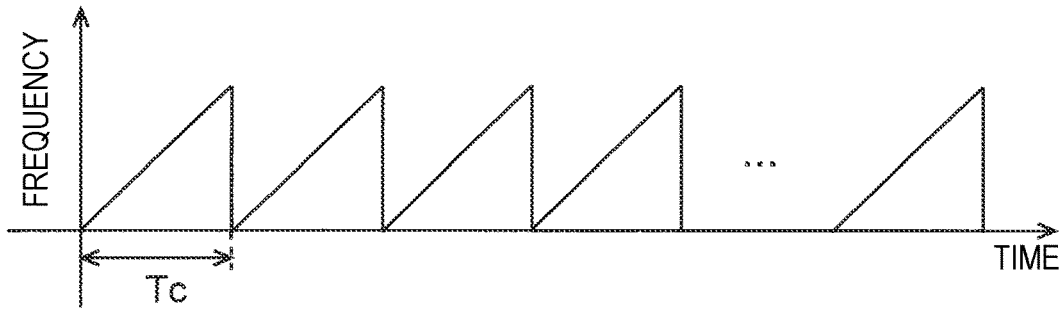
FIG. 12 is a chart for description of a transmission control that is performed in a second mode.

FIG. 12 is a chart for description of a transmission control that is performed in a second mode in the radar device according to the second embodiment. As shown in the upper part of FIG. 12, the transmission unit 2A generates, under the control of the transmission control unit 42, a transmission signal in which a chirp signal whose frequency increases over time is repeated at the prescribed cycle Tc. Transmission waves TW are transmitted according to the transmission signal.

The lower part of FIG. 12 shows a control operation performed on the phase shifters PS. As shown in the lower part of FIG. 12, in the second mode, the first phase shifter PS1 and the second phase shifter PS2 supply the transmission antennas 231a and 231b with transmission signals having the same phase at the chirp cycle Tc. The third phase shifter PS3 supplies the second transmission antenna group 232 with a transmission signal whose phase is inverted at the chirp cycle Tc.

In other words, in the second mode, the transmission control unit 42 causes the synthesized antenna 233 and the second transmission antenna group 232 to transmit transmission waves TW in different phase modulation patterns. This makes it possible to discriminate between a reception signal that originates from transmission waves TW transmitted from the synthesized antenna 233 and a reception signal that originates from transmission waves TW transmitted from the second transmission antenna group 232. That is, a virtual array antenna can be constructed by combining the synthesized antenna 233, the second transmission antenna group 232, and the two reception antennas 31a and 31b. More specifically, as in the first embodiment, a second virtual array antenna VAA2 consisting of four virtual antennas 33e-33h can be constructed by the synthesized antenna 233, the second transmission antenna group 232, and the two reception antennas 31a and 31b.

As described above, the transmission control unit 42 has the plural kinds of, prescribed transmission patterns for transmission of transmission waves TW. In the embodiment, the plural kinds of, prescribed transmission patterns include patterns that are different from each other in the phase modulation pattern for transmission. That is, phase modulation patterns generated by the first phase shifter PS1, the second phase shifter PS2, and the third phase shifter PS3 constitute each transmission pattern.

In the first mode, the transmission control unit 42 controls each of the transmission antennas 231a and 231b of the first transmission antenna group 231 by assigning it one of the plural kinds of transmission patterns. In the above example, the phase modulation pattern (see FIG. 11) generated by the first phase shifter PS1 is assigned to the transmission antenna 231a as a transmission pattern. The phase modulation pattern (see FIG. 11) generated by the second phase shifter PS2 is assigned to the transmission antenna 231b as a transmission pattern.

In the second mode, the transmission control unit 42 controls each of the synthesized antenna 233 and the second transmission antenna group 232 by assigning it one of the plural kinds of transmission patterns. In the above example, the phase modulation patterns (see FIG. 12) that are generated by the first phase shifter PS1 and the second phase shifter PS2 as the same pattern are assigned to the synthesized antenna 233 as transmission patterns. The phase modulation pattern (see FIG. 12) generated by the third phase shifter PS3 is assigned to the second transmission antenna group 232 as a transmission pattern.

2-3. Signal Processing 2-3-1. First Mode

Figure 13:
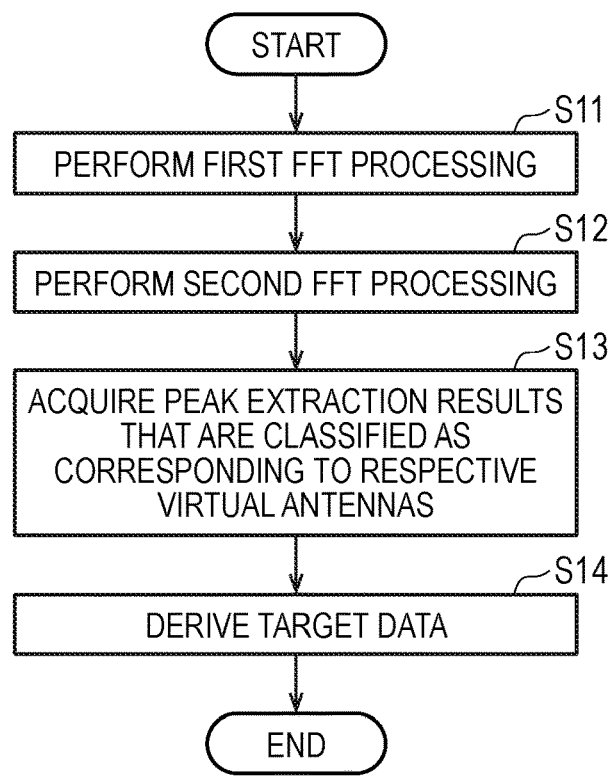
FIG. 13 is a flowchart of a signal processing process for deriving target data.

FIG. 13 is a flowchart of a signal processing process for deriving target data in the radar device according to the second embodiment. The signal processing process shown in FIG. 13 is executed for signals obtained from the respective reception antennas 31a and 31b of the radar device.

At step S11, first FFT processing is performed on a beat signal of each chirp cycle Tc obtained as corresponding to transmission waves TW transmitted from each of the two transmission antennas 231a and 231b.

At step S12, frequency spectra obtained by performing the first FFT processing on respective beat signals are arranged in time series and second FFT processing is performed thereon. A two-dimensional power spectrum having a distance bin axis and a speed bin axis is obtained by the second FFT processing. A combination of a distance bin and a speed bin where a peak whose power value is larger than a prescribed value is determined as a combination of a distance bin and a speed bin where a peak exists.

Incidentally, in the first mode, transmission waves TW are transmitted from the one transmission antenna 231a and the other transmission antenna 231b with different phase modulation patterns. Thus, two peaks corresponding to the same target appear in the two-dimensional power spectrum in such forms as to reflect the different phase modulation patterns. That is, a peak corresponding to the first virtual antenna 33a and a peak corresponding to the second virtual antenna 33b can be separated from a two-dimensional power spectrum obtained by processing signals received by the one reception antenna 31a. A peak corresponding to the third virtual antenna 33c and a peak corresponding to the fourth virtual antenna 33d can be separated from a two-dimensional power spectrum obtained by processing signals received by the other reception antenna 31b. Thus, at step S13, the peak extraction unit 441 acquires peak extraction results that are classified as corresponding to the respective virtual antennas 33a-33d on the basis of results of the second FFT processing performed on the signals obtained from the reception antennas 31a and 31b.

At step S14, the target data deriving unit 442 derives target data on the basis of the peak extraction results acquired for the respective virtual antennas 33a-33d. More specifically, the target data deriving unit 442 estimates a direction of each target using a known technique such as MUSIC or ESPRIT. The target data deriving unit 442 derives a distance and a relative speed of each target on the basis of a combination of a distance bin and a speed bin that have been determined as peak bins. In the first mode, as described above, the detection area is a short-distance, wide-angle area. Thus, the first mode can be used when, for example, it is desired to realize an RCTA system using the radar device.

2-3-2. Second Mode

In the second mode, the radar device derives target data by performing signal processing similar to the signal processing performed in the first mode. A signal processing process that is executed in the second mode will therefore be described briefly with reference to FIG. 13.

At step S11, first FFT processing is performed on a beat signal of each chirp cycle Tc obtained as corresponding to transmission waves TW that are transmitted from each of the synthesized antenna 233 and the second transmission antenna group 232.

At step S12, frequency spectra obtained by performing the first FFT processing on respective beat signals are arranged in time series and second FFT processing is performed thereon. A two-dimensional power spectrum having a distance bin axis and a speed bin axis is obtained by the second FFT processing. A combination of a distance bin and a speed bin where a peak whose power value is larger than a prescribed value is determined as a combination of a distance bin and a speed bin where a peak exists.

Incidentally, in the second mode, transmission waves TW are transmitted from the synthesized antenna 233 and the second transmission antenna group 232 with different phase modulation patterns. Thus, a peak corresponding to the fifth virtual antenna 33e and a peak corresponding to the seventh virtual antenna 33g can be separated from a two-dimensional power spectrum obtained by processing signals received by the one reception antenna 31a. A peak corresponding to the sixth virtual antenna 33f and a peak corresponding to the eighth virtual antenna 33h can be separated from a two-dimensional power spectrum obtained by processing signals received by the other reception antenna 31b.

Thus, at step S13, the peak extraction unit 441 acquires peak extraction results that are classified as corresponding to the respective virtual antennas 33e-33h on the basis of results of the second FFT processing performed on the signals obtained from the reception antennas 31a and 31b.

At step S14, the target data deriving unit 442 derives target data on the basis of the peak extraction results acquired for the respective virtual antennas 33e-33h. More specifically, the target data deriving unit 442 estimates a direction of each target using a known technique such as MUSIC or ESPRIT. The target data deriving unit 442 derives a distance and a relative speed of each target on the basis of a combination of a distance bin and a speed bin that have been determined as peak bins. In the second mode, as described above, the detection area is a long-distance, narrow-angle area. Thus, the second mode can be used when, for example, it is desired to realize an LCA system using the radar device.

3. Embodiment 3

A radar device according to a third embodiment has approximately the same configuration as the radar device 1 according to the first embodiment. Thus, that part of the third embodiment which is common to the first embodiment will not be described; that part of the third embodiment which is different from the first embodiment will mainly be described below. Items having the same ones in the first embodiment will be given the same reference symbols as the latter.

Figure 14:
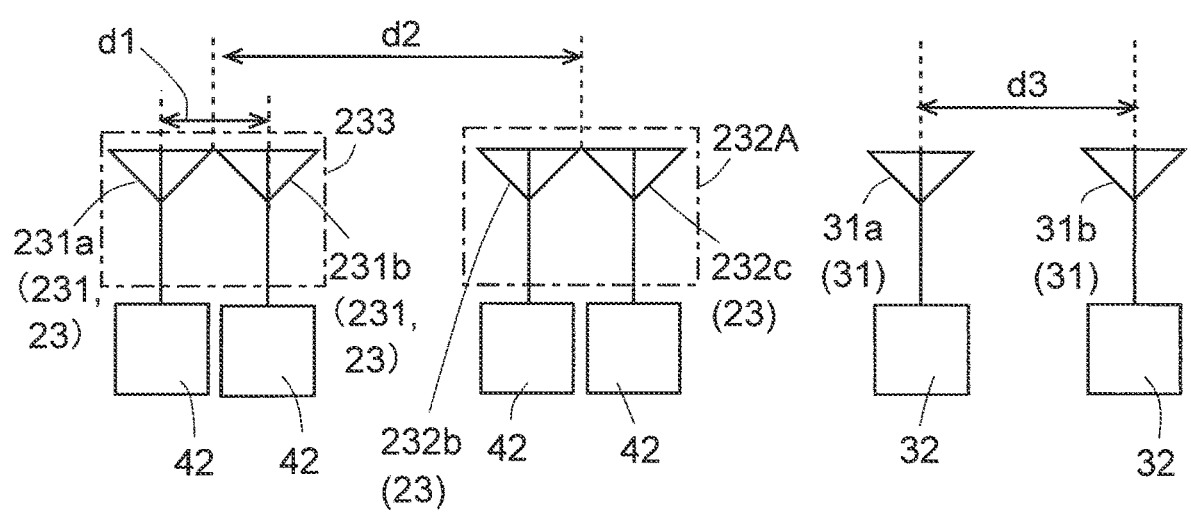
FIG. 14 is a diagram showing an antenna configuration of a radar device according to a third embodiment.

FIG. 14 is a diagram showing the configurations of antennas 23 and 31 employed in the radar device according to the third embodiment. The configuration of the reception antennas 31 is the same as in the first embodiment. The plural transmission antennas include a first transmission antenna group 231 having two transmission antennas 231a and 231b which are spaced from each other by a prescribed first interval d1. A synthesized antenna 233 is constructed by causing the two transmission antennas 231a and 231b to operate in a synchronized manner. These features are the same as in the first embodiment.

The plural transmission antennas 23 include a second transmission antenna group 232A in addition to the first transmission antenna group 231. The second embodiment is different from the first embodiment in the configuration of the second transmission antenna group 232A. The second transmission antenna group 232A is equipped with plural transmission antennas 232b and 232c which can be controlled independently of each other by the transmission control unit 42. The second transmission antenna group 232A is a synthesized antenna in which the plural transmission antennas 232b and 232c are regarded as a single antenna.

In this embodiment, the second transmission antenna group 232A consists of two transmission antennas 232b and 232c which can be controlled independently of each other. The second transmission antenna group 232A functions as a synthesized antenna by causing the two transmission antennas 232b and 232c to operate in phase in a synchronized manner. More specifically, each of the two transmission antennas 232b and 232c constituting the second transmission antenna group 232A has the same antenna characteristics as each of the two transmission antennas 231a and 231b of the first transmission antenna group 231. The two transmission antennas 232b and 232c are spaced from each other by a prescribed first interval d1 in the horizontal direction. The number of transmission antennas that constitute the second transmission antenna group 232A may be changed as appropriate according to, for example, the number of transmission antennas constituting the first transmission antenna group 231. As in the first embodiment, the interval between the synthesized antenna 233 and the second transmission antenna group 232A in the horizontal direction is equal to the second interval d2.

With the configuration of this embodiment, the first virtual array antenna VAA1 and the second virtual array antenna VAA2 can be constructed in the same manner as in the first embodiment. Switching can be made between the first mode and the second mode to change the shape of a transmission beam. Furthermore, with the configuration of this embodiment, the number of transmission antennas that can be controlled independently of each other is made larger than in the first embodiment and hence the number of virtual antennas that are constructed by combining plural transmission antennas and plural reception antennas can be increased.

4. Items to be Noted

The embodiments and modifications described in this specification are just examples of the invention and may be changed as appropriate without departing from the technical concept of the invention. Parts of the embodiments and modifications may be combined with each other as long as they can be done so.

What is claimed is:

1. A radar device comprising:
  reception array antennas each comprising virtual antennas constructed from plural transmission antennas and plural reception antennas; and
  a transmission control unit which controls transmission waves transmitted from the transmission antennas, wherein:
  the plural transmission antennas comprise:
    a first transmission antenna group having at least two of the transmission antennas that are spaced from each other by a prescribed first interval; and
    a second transmission antenna group having at least one of the transmission antenna that is spaced, by a prescribed second interval, from a synthesized antenna that is the first transmission antenna group as regarded as a single antenna; and
  the transmission control unit is capable of switching between:
    a first mode in which to control the transmission antennas of the first transmission antenna group independently of each other; and
    a second mode in which to control the synthesized antenna and the second transmission antenna group independently of each other.

2. The radar device according to claim 1, wherein:
  the transmission antennas of the first transmission antenna group have approximately same antenna characteristics; and
  the synthesized antenna and the second transmission antenna group as regarded as a single antenna have approximately same antenna characteristics.

3. The radar device according to claim 1, wherein when the second transmission antenna group is regarded as a single antenna, the second transmission antenna group has an aperture area that is obtained by multiplying an aperture area of each of the transmission antennas of the first transmission antenna group by number of the transmission antennas of the first transmission antenna group.

4. The radar device according to claim 2, wherein when the second transmission antenna group is regarded as a single antenna, the second transmission antenna group has an aperture area that is obtained by multiplying an aperture area of each of the transmission antennas of the first transmission antenna group by number of the transmission antennas of the first transmission antenna group.

5. The radar device according to claim 1, wherein the transmission control unit
has plural kinds of prescribed transmission patterns in which to transmit transmission waves;
in the first mode, controls the transmission antennas of the first transmission antenna group by assigning one of the transmission patterns to each of the transmission antennas of the first transmission antenna group; and
in the second mode, controls the synthesized antenna and the second transmission antenna group by assigning one of the transmission patterns to each of the synthesized antenna and the second transmission antenna group.

6. The radar device according to claim 2, wherein the transmission control unit
has plural kinds of prescribed transmission patterns in which to transmit transmission waves;
in the first mode, controls the transmission antennas of the first transmission antenna group by assigning one of the transmission patterns to each of the transmission antennas of the first transmission antenna group; and
in the second mode, controls the synthesized antenna and the second transmission antenna group by assigning one of the transmission patterns to each of the synthesized antenna and the second transmission antenna group.

7. The radar device according to claim 3, wherein the transmission control unit
has plural kinds of prescribed transmission patterns in which to transmit transmission waves;
in the first mode, controls the transmission antennas of the first transmission antenna group by assigning one of the transmission patterns to each of the transmission antennas of the first transmission antenna group; and
in the second mode, controls the synthesized antenna and the second transmission antenna group by assigning one of the transmission patterns to each of the synthesized antenna and the second transmission antenna group.

8. The radar device according to claim 5, wherein the plural kinds of prescribed transmission patterns comprise patterns that are deviated from each other in transmission-on timing and transmission-off timing.

9. The radar device according to claim 6, wherein the plural kinds of prescribed transmission patterns comprise patterns that are deviated from each other in transmission-on timing and transmission-off timing.

10. The radar device according to claim 7, wherein the plural kinds of prescribed transmission patterns comprise patterns that are deviated from each other in transmission-on timing and transmission-off timing.

11. The radar device according to claim 5, wherein the plural kinds of prescribed transmission patterns comprise patterns that are different from each other in a transmission phase modulation pattern.

12. The radar device according to claim 6, wherein the plural kinds of prescribed transmission patterns comprise patterns that are different from each other in a transmission phase modulation pattern.

13. The radar device according to claim 7, wherein the plural kinds of prescribed transmission patterns comprise patterns that are different from each other in a transmission phase modulation pattern.

14. The radar device according to claim 1, wherein the second transmission antenna group is a synthesized antenna in which a plurality of the transmission antennas that can be controlled independently of each other by the transmission control unit are regarded as a single antenna.

15. The radar device according to claim 2, wherein the second transmission antenna group is a synthesized antenna in which a plurality of the transmission antennas that can be controlled independently of each other by the transmission control unit are regarded as a single antenna.

16. The radar device according to claim 3, wherein the second transmission antenna group is a synthesized antenna in which a plurality of the transmission antennas that can be controlled independently of each other by the transmission control unit are regarded as a single antenna.

17. The radar device according to claim 4, wherein the second transmission antenna group is a synthesized antenna in which a plurality of the transmission antennas that can be controlled independently of each other by the transmission control unit are regarded as a single antenna.

18. The radar device according to claim 1, wherein the plural virtual antennas are arranged at same intervals in a prescribed direction in each of the first mode and the second mode.

19. The radar device according to claim 2, wherein the plural virtual antennas are arranged at same intervals in a prescribed direction in each of the first mode and the second mode.

20. The radar device according to claim 3, wherein the plural virtual antennas are arranged at same intervals in a prescribed direction in each of the first mode and the second mode.

* * * * *